(12) United States Patent
Ciszak et al.

(10) Patent No.: US 8,388,491 B2
(45) Date of Patent: Mar. 5, 2013

(54) SYSTEM AND ASSEMBLY FOR POWER TRANSMISSION AND GENERATION IN A WIND TURBINE

(75) Inventors: Robert Ciszak, Lawrence Park, PA (US); Timothy Kuzma, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/313,300

(22) Filed: Dec. 7, 2011

(65) Prior Publication Data

US 2012/0074700 A1 Mar. 29, 2012

Related U.S. Application Data

(63) Continuation of application No. 12/205,110, filed on Sep. 5, 2008, now Pat. No. 8,075,442.

(51) Int. Cl.
*F16H 57/08* (2006.01)
(52) U.S. Cl. ..................................... 475/331
(58) Field of Classification Search ............ 475/331
See application file for complete search history.

(56) References Cited

U.S. PATENT DOCUMENTS

| | | |
|---|---|---|
| 5,433,535 A | 7/1995 | Hah |
| 6,170,506 B1 | 1/2001 | Butwin et al. |
| 7,410,442 B2 | 8/2008 | Fox |
| 8,075,442 B2 * | 12/2011 | Ciszak et al. ............ 475/331 |
| 2007/0265133 A1 | 11/2007 | Smook |

OTHER PUBLICATIONS

"Vestas V90-3MW", http://en.wikipedia.org/wiki/Vestas_V90-3MW, Accessed Sep. 22, 2008.
"3.0 MW—An Efficient Way to More Power", http://www.vestas.com/en/wind-power-solutions/wind-turbines/3.0-mw.aspx, © Vestas 2007 all rights reserved, Accessed Sep. 22, 2008.

\* cited by examiner

*Primary Examiner* — Edwin A Young
(74) *Attorney, Agent, or Firm* — GE Global Patent Operation; John A. Kramer (57) ABSTRACT

Various power transmission and generation systems and assemblies are provided for a wind turbine. In one embodiment, a power generation system is provided including a transmission having an input axially aligned with an output, the input configured to receive rotary motion generated by a wind driven rotor head, the input located downwind of the output, an electromagnetic apparatus having an input configured to be coupled to the transmission output, and a bearing configured to radially support both the transmission output and the electromagnetic apparatus input. In this way, a common bearing may support both the transmission and electromagnetic apparatus, allowing for a more compact and efficient design while retaining service and repair capabilities.

32 Claims, 8 Drawing Sheets

SYSTEM AND ASSEMBLY FOR POWER TRANSMISSION AND GENERATION IN A WIND TURBINE

CROSS REFERENCE TO RELATED APPLICATIONS

The present application is a continuation of U.S. patent application Ser. No. 12/205,110 filed Sep. 5, 2008, the entire contents of which are incorporated herein by reference for all purposes.

FIELD

The present application relates to power systems of wind turbines.

BACKGROUND

Due to the high growth rate of the wind turbine industry, an increasing number of power generation components have been developed by a multitude of companies. Many of these companies independently design and manufacture various components included in the power generation system of the wind turbine, such as gearboxes and generators. In this way, manufactures select a desired gearbox, generator, etc., in designing the overall wind turbine. On the other hand, the overall size of a power generation unit in the wind turbine may lead to increased up-tower mass.

As such, various approaches may be used to integrate one or more components of a wind turbine, such as integrating a gearbox and generator in a common housing to form an integrated power generation system.

However, the inventors herein have recognized several issues with such integration. For example, assembling, testing, servicing and/or repairing a fully integrated power generation system may be extremely difficult, leaving the wind turbine inoperable. Therefore, the lifespan of the wind turbine may be significantly reduced or repair and maintenance costs may be excessive. Furthermore, due to the growth in the wind turbine industry, the global supply chain has delivery pressures, and thus an integrated generator and gearbox having a common housing, or other similar features, may overly restrict the separate manufacturing and supply of the gearbox and generator that would otherwise alleviate delivery pressures.

BRIEF DESCRIPTION OF THE INVENTION

Various power transmission, and generation systems, and assemblies are provided for a wind turbine. In one embodiment, a power generation system is provided including a transmission having an input axially aligned with an output, the input configured to receive rotary motion generated by a wind driven rotor head, the input located downwind of the output, an electromagnetic apparatus having an input configured to be coupled to the transmission output, and a bearing configured to radially support both the transmission output and the electromagnetic apparatus input. In this way, a common bearing may support both the transmission and electromagnetic apparatus, allowing for a more compact and efficient design while retaining service and repair capabilities.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
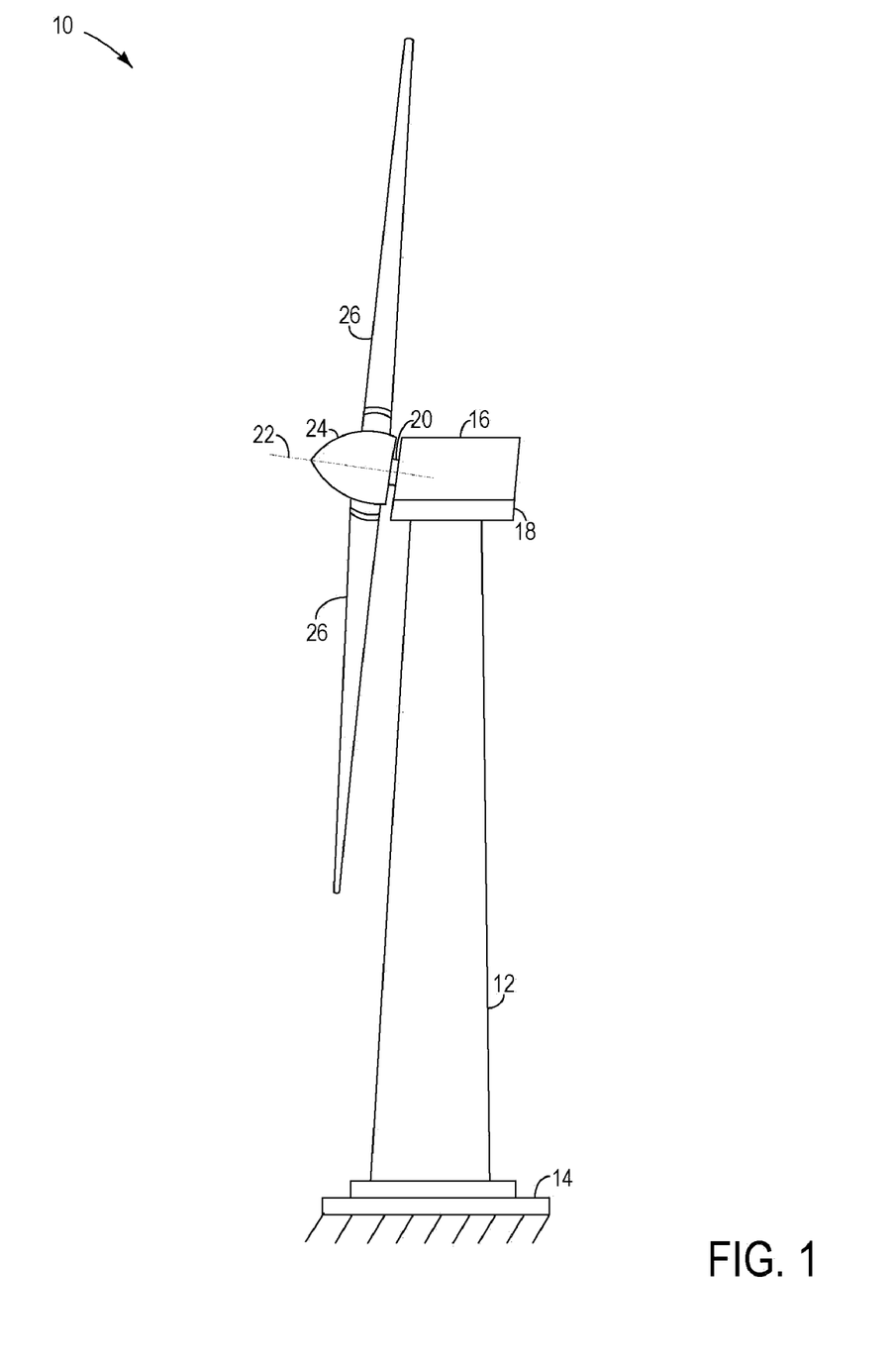
FIG. 1 shows an illustration of a power generating wind turbine.

A power generating wind turbine 10 is shown in FIG. 1. The turbine includes a tower 12 extending substantially vertically out of a base 14. The tower may be constructed from a plurality of stacked components. However, it can be appreciated that alternate configurations of the tower are possible, such as a lattice tower. A nacelle 16 and nacelle bedplate 18 are positioned atop the tower. A drive unit (not shown) may be included in the nacelle bedplate, allowing the nacelle to rotate about a horizontal plane. The nacelle may be positioned, by the drive unit, directly into the wind, increasing the power output of the wind turbine. Further in some examples, a drive unit controls the vertical pitch of the blades. The nacelle houses a power generation system having a transmission and an electromagnetic apparatus, shown in FIG. 2 discussed in greater detail herein. Further, various power electronics and control electronics may be housed in nacelle 16.

A main shaft 20 extends out of the nacelle. The main shaft may be coupled to a transmission by an input carrier (not shown) sharing a common central axis 22 with the main shaft. Furthermore, the main shaft 20 may be coupled to a rotor head 24. A plurality of rotor blades 26 may be radially position around the rotor head 24. A wind force (not shown) may act on the rotor blades, rotating the blades and therefore the rotor head about the central axis. Thus, the rotor head is wind driven. The rotor head may be configured to reduce drag on the wind turbine, thereby reducing the axial load (e.g. thrust) on bearings in the wind turbine.

Figure 2:
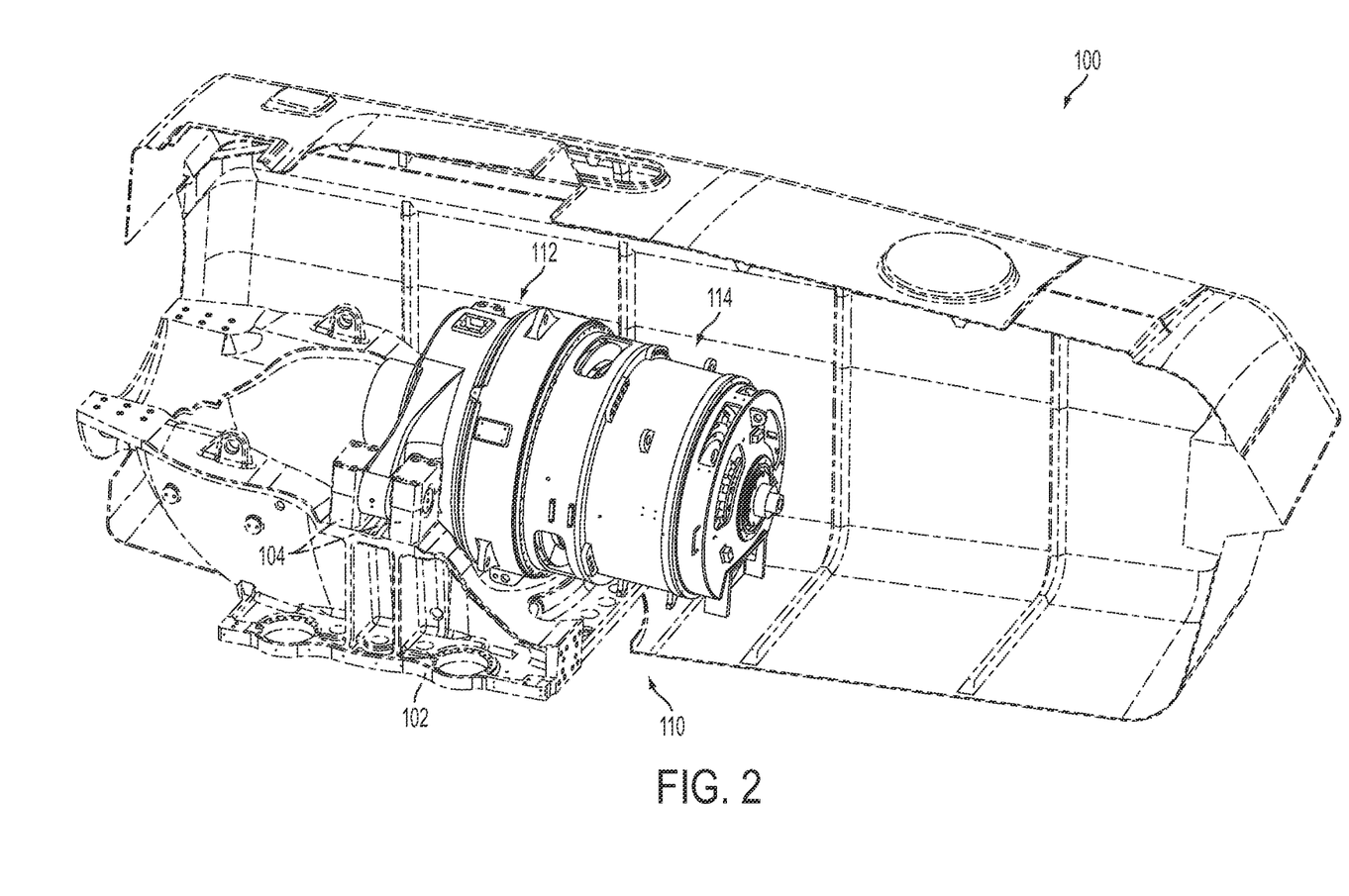
FIG. 2 shows a power generation system enclosed by a nacelle.

A cut-away view of an example nacelle 100, which may be used as the nacelle 16, is illustrated in FIG. 2, showing various components enclosed therein. The nacelle 100 houses a power generation system 110, allowing wind force to be converted to electrical energy. The power generation system includes components such as a transmission 112 and an electromagnetic apparatus (e.g. generator) 114. The transmission may be configured to increase the rotation speed of the rotary motion generated by the rotor blades. Further, the electromagnetic apparatus 114 may be configured to convert mechanical energy into electrical energy. The aforementioned components are discussed in greater detail with regard to FIGS. 3-11.

The Nacelle may further include a base-plate 102 configured to attach to the power generation system (e.g. the transmission and generator) to the nacelle 100 by torque couplings 104. Thus, the torque couplings may react at least a portion of the torque from the transmission. Specifically, in this example, the base-plate includes two torque couplings laterally positioned in the nacelle. However, it can be appreciated that the size, position, and/or shape of the torque couplings may be modified in alternate embodiments.

The nacelle may include various other components such as a main shaft (not shown), extending out of the rotor head, and/or rotor head housing coupling (not shown), configured to support a portion of the rotor head. It can be appreciated that additional coupling configured to attach various components enclosed by the nacelle, such as the generator, may be utilized.

Additionally, a cooling system (not shown) may be included in the nacelle, directing ambient air, around the power generation system, thereby allowing heat to be transferred from the power generation system to the air, cooling the power generation system. The open loop cooling system may passively direct ambient air around the power generation system (e.g. transmission and/or electromagnetic apparatus) and/or actively direct ambient air around the power generation system by the use of a fan (not shown). Additionally or alternatively, a closed loop air or water-based (or other liquid) cooling system (not shown) may be utilized, the cooling system including a radiator configured to remove heat from the water to ambient air. The cooling system may be positioned above the transmission 112 and/or the electromagnetic apparatus 114.

In FIG. 2, nacelle 100 is sized similarly to production wind turbine designs. The substantial amount of additional space behind power generation system 110 illustrates the space-saving nature of the example design configurations described in further detail herein. Specifically, as will be described further herein, an integrated assembly used in the power generation system 110 shares structural supporting, such as bearing elements, among the transmission 112 and the electromagnetic apparatus 114.

In one embodiment, the additional space in the nacelle may be used to house power electronics (e.g., one or more transformers) for converting low-voltage power output of the generator to high voltage power for long-distance transmission. The power electronics may be electronically coupled to the electromagnetic apparatus. As such, up-tower transformers (not shown) may be used. In this way, rather than experiencing low-voltage losses in transmitting the generator output to voltage converters on the ground or the base 14 of the turbine, it is possible to transmit high voltage power down the tower 12, thereby improving overall wind turbine performance.

In an alternative embodiment, a nacelle design may be used which is substantially smaller in size than that shown in FIG. 2. Here, a smaller volume nacelle may be coupled with the space-saving power generation system 110 to reduce up-tower mass, thereby enabling overall wind turbine nacelle and tower weight savings, for example.

FIGS. 3-11 illustrate various views of an embodiment of a power generation assembly 111 forming at least a portion of the power generation system 110, shown in FIG. 2, as well as individual components included in the power generation assembly. Similar parts are labeled accordingly. It can be appreciated that various components in the power generation assembly may be separately manufactured, tested, and then assembled on site, decreasing construction costs. Further, each component may be removed from the nacelle and service (e.g. repaired) or replaced. In this way, it is possible to repair smaller sections of the wind turbine, decreasing the cost of repair.

Figure 3:
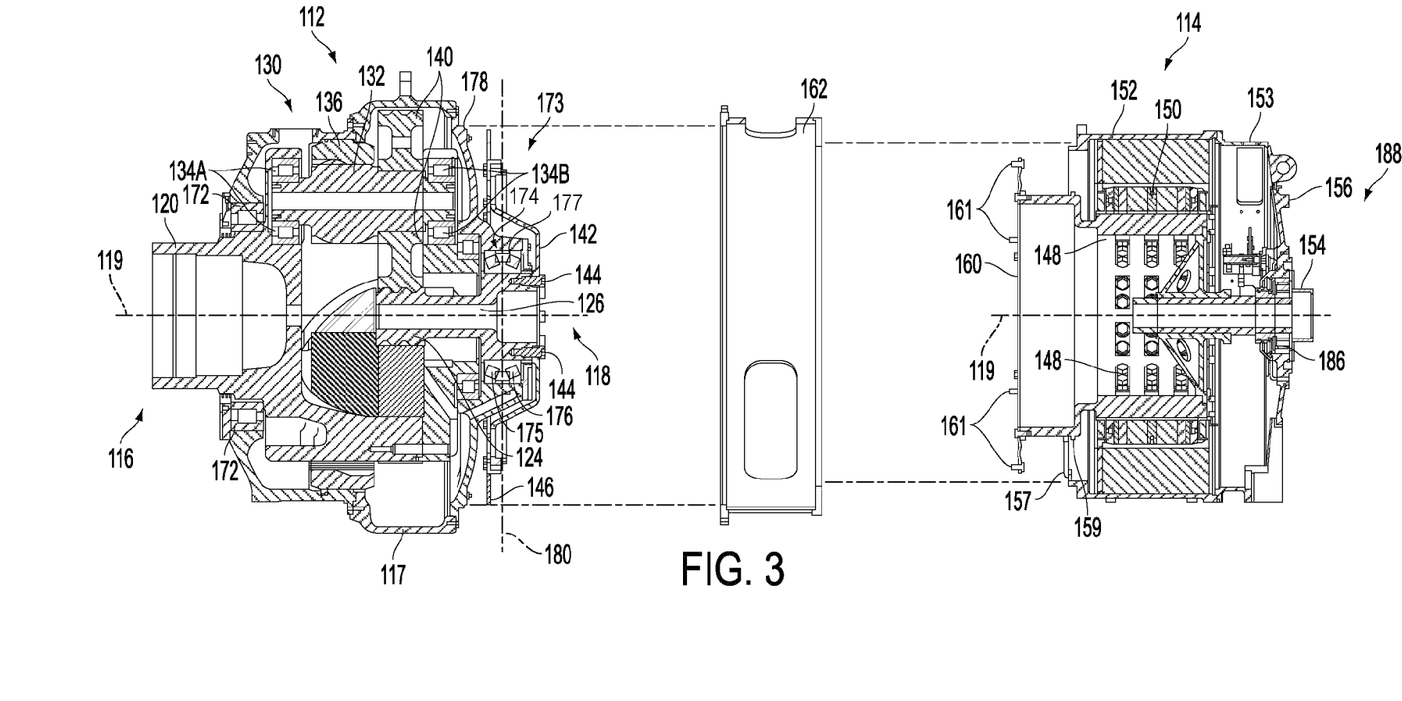
FIG. 3 illustrates an exploded view of a power generation assembly.
Figure 4:
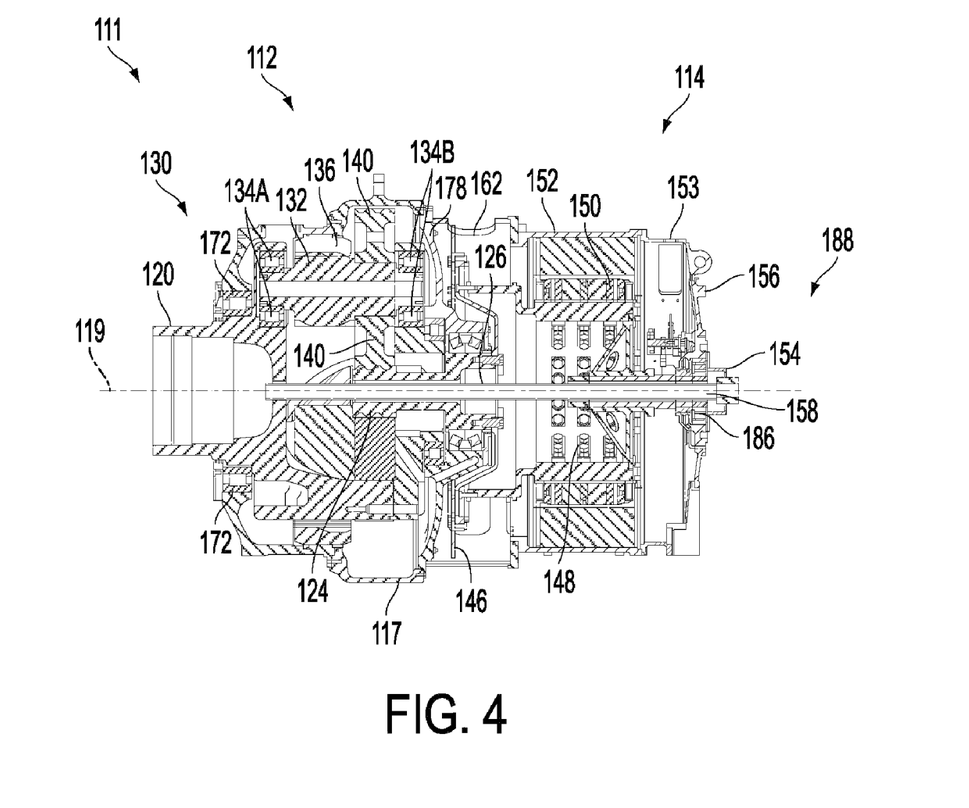
FIG. 4 shows a cut away view of an assembled power generation assembly.
Figure 5:
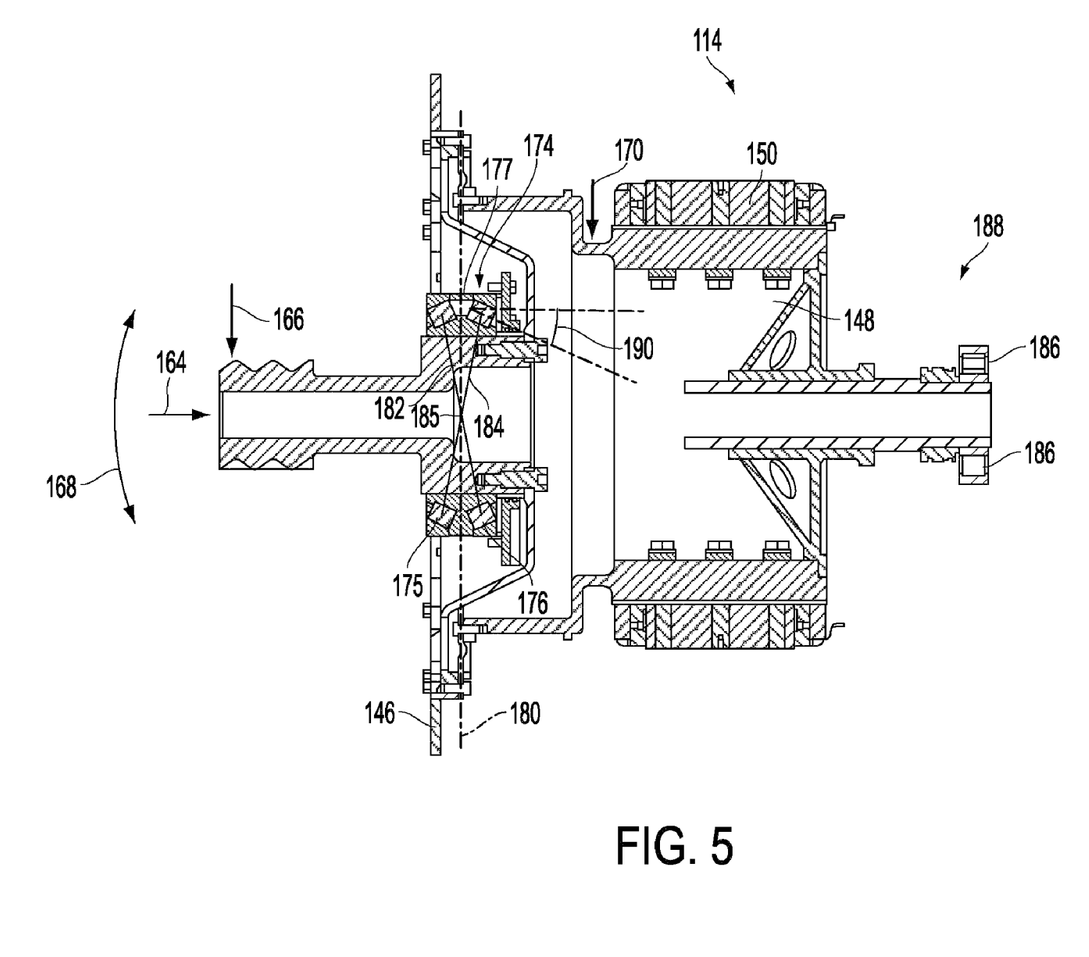
FIG. 5 illustrates a cut-away side view of selected components of the power generation assembly.
Figure 6:
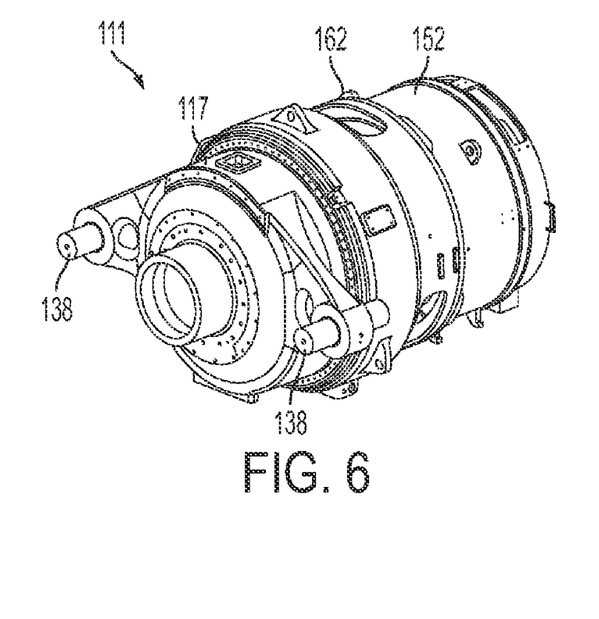
FIG. 6 shows an isometric view of a power generation assembly.
Figure 7:
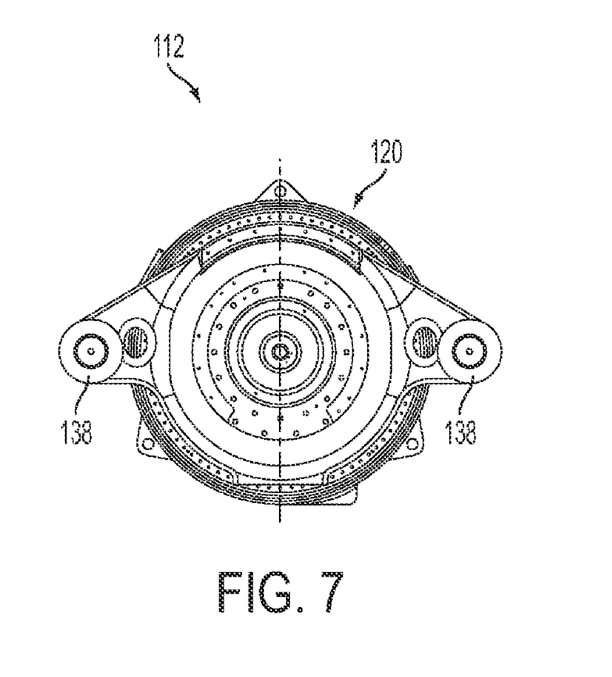
FIG. 7 illustrates a front view of a power generation assembly.
Figure 8:
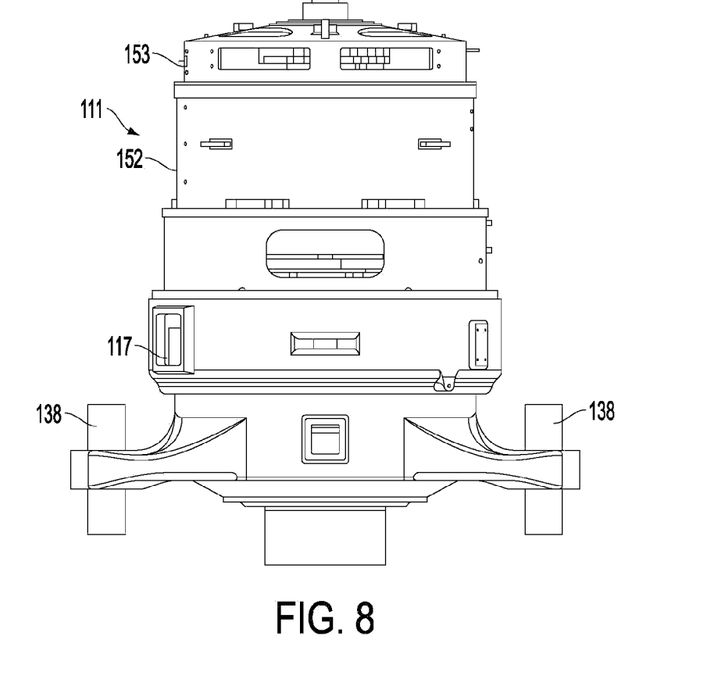
FIG. 8 shows a top view of a power generation assembly.
Figure 9:
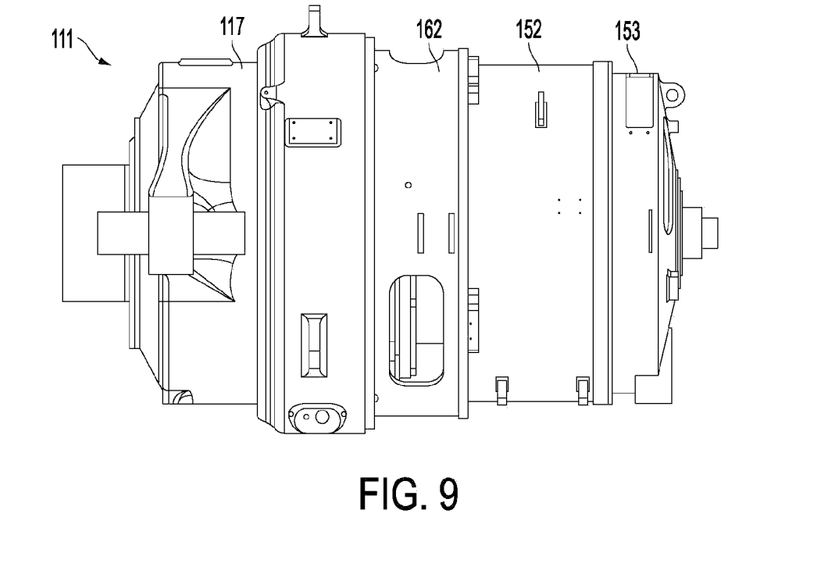
FIG. 9 illustrates a side view of a power generation assembly.
Figure 10:
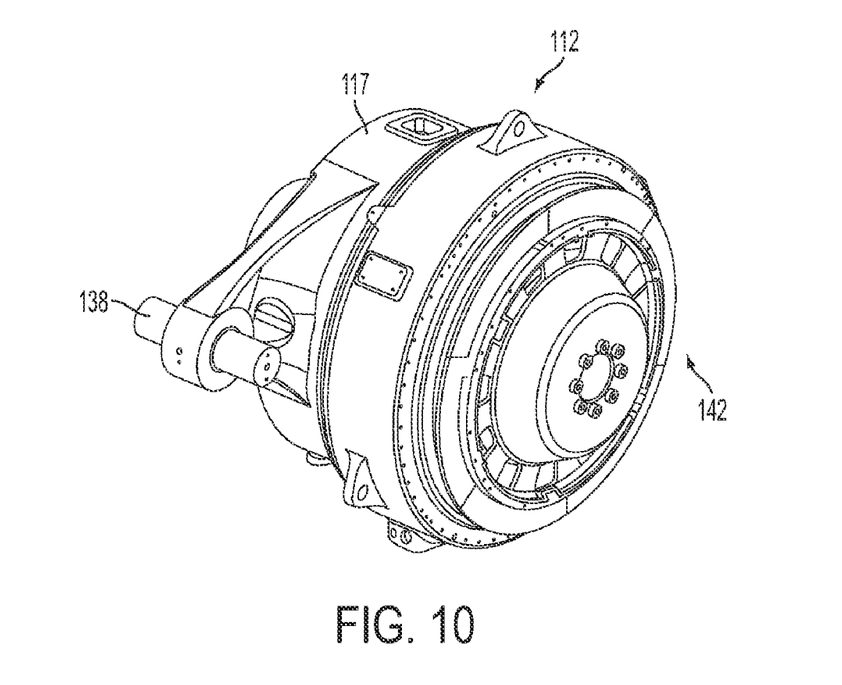
FIGS. 10-11 illustrate isometric views of a transmission and electromagnetic apparatus included in a power generation assembly, respectively. The figures are drawn approximately to scale.
Figure 11:
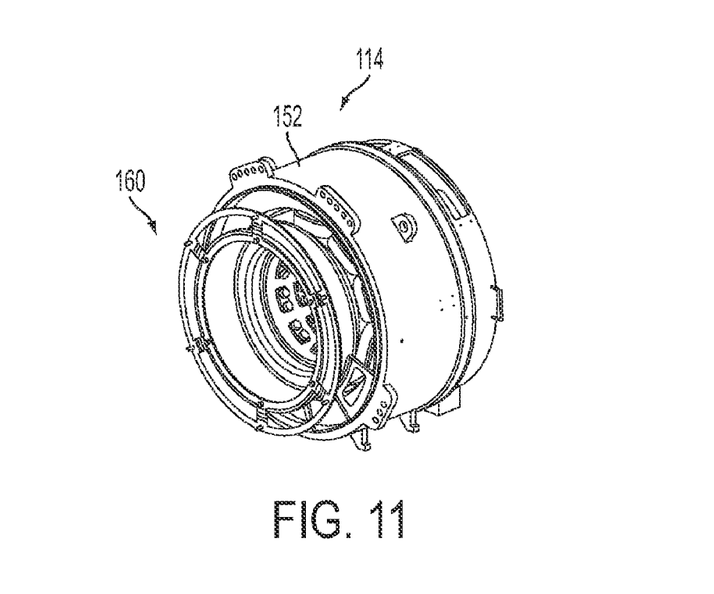

In particular, FIG. 3 illustrates an exploded side view of the power generation assembly. FIG. 4 illustrates a cut-away side view of the power generation assembly in an assembled configuration. FIG. 5 illustrates another cut-away side view of selected components of the power generation assembly. FIG. 6 illustrates an isometric view of the power generation assembly in the assembled configuration. FIG. 7 illustrates a front view of the power generation assembly in the assembled configuration. FIG. 8 shows a top view of the power generation assembly in the assembled configuration. FIG. 9 shows a side view of the power generation assembly in the assembled configuration. Lastly, FIGS. 10-11 illustrate isometric views of the transmission and electromagnetic apparatus, respectively, disassembled from one another.

Returning to FIG. 3, it shows transmission 112 and an electromagnetic apparatus 114 as components of the power generation assembly 111. The transmission may comprise a gearbox as one example for gearing up output of the shaft 20, shown in FIG. 1. The transmission 112 includes an input 116, an output 118, and a transmission housing 117. The transmission housing encloses various components of the transmission, such as a longitudinally positioned planetary gear-train 130 comprised of various gears as described herein. The transmission is configured to adjust the rotational speed of the input from the wind actuated rotor head, allowing a generator to more efficiently utilize the rotational energy from the transmission to extract electrical power from the power generation system. For instance, the transmission may increase the rotational speed of the input, while reducing torque.

Numerous suitable transmissions having an input and an output may be utilized. In this embodiment, a compound star planetary gearbox including a fixed annulus (e.g. ring gear) is used, due to its compact and efficient design. However, it can be appreciated that alternate suitable types of transmissions may be used, such as a fixed carrier compound star planetary gearbox, simple planetary gearbox, differential planetary gearbox, or power-splitting parallel shaft gearbox with a concentric output shaft, etc. Further, the transmission's input and output may be co-axially aligned, thereby sharing a common central rotating axis 119, where the common central axis is the axis of rotation of the input and the output of the transmission. Further, the common central rotating axis 119 may be located on the centerline of the turbine, turbine rotor, and/or turbine blades.

In the planetary gearbox shown in FIG. 3, the input 116 of the transmission 112 includes an input carrier 120 configured to be rotatably coupled to a rotor head by a suitable coupling, such as a plurality of bolts directed through a plurality bored holes in a flange, by use of a shrink disc, or by an integrated rotor shaft. In this way, the wind driven rotor head may transfer rotational energy into the transmission. Furthermore, the input carrier's axis of rotation may be aligned with the central rotating axis 119. The output of the transmission includes a sun gear 124 rigidly fixed to an output shaft 126, such that the output shaft 126 and the sun gear 124 rotate as one. Again, the output shaft's rotational axis may be aligned with the central rotating axis 119, and the output shaft 126 may extend outside the transmission housing.

The planetary gear-train 130 connects the transmission input and output through one or more planet gears orbitally revolving about, and driving, the sun gear (and thus the output shaft). In this example, the gear-train includes a plurality of planet gears (where one planetary gear is formed by interior planet gear section 132 and exterior planet gear section 140 with the planetary gears driven by, and rotatably affixed to the input carrier 120. Specifically, the input carrier 120 rotates the central axis of the planetary gears and about the central rotating axis 119, where the planets are further driven to rotate about their own axis by the fixed ring gear 136.

The input carrier 120 may be supported by the housing via an input bearing 172, such as tapered roller bearing. In other examples, alternate suitable bearings types may be utilized. Further, two bearings, 134A and 134B may be respectively coupled to the front and the rear portion of the interior planet gear section, allowing the planet gears to rotate about their own axes. It can be appreciated that the number of bearings may be adjusted depending on various design specifications, and further the term bearing may include single, double, triple, or other combination bearings. As noted, a fixed annulus 136 (e.g. ring gear) may be coupled to the planet gears by meshing engagement with the interior planet gear section, where the fixed annulus is torsionally coupled to and fixed to the transmission housing.

A pair of torque supports 138, shown in FIGS. 6-8, are coupled to the transmission housing, react the torque from the annulus, the emergency brake and the generator. As previously discussed with regard to FIG. 2, the torque supports may be fixed to the base-plate included in the nacelle and may vary in design (e.g., a torque ring may be used).

Returning to FIG. 3, and as noted above, the fixed annulus 136 directs the planet gears in orbital rotation. The exterior planet gear sections are in meshing engagement with the sun gear 124, to transfer the motion and rotation of the planet gears into motion of the sun gear and thus the output shaft. Each of the meshing gear engagements, including between the ring gear and the planetary gears, as well as between the planetary gears and the sun gear, may be helical meshing engagement.

The sun gear (and output shaft) may be supported by, and coupled to, transmission bearing 174. The transmission bearing 174 may further be coupled to an exterior portion 173 of the transmission. The exterior portion may include a downwind portion of the transmission outside of the gear-train. In some examples, the transmission bearing may be a locating bearing including a double row tapered roller bearing including a first and a second row of tapered rollers, 175 and 176, respectively shown also in FIG. 5. Further, in some examples the tapered rollers may be sections of a cone. Each row of tapered roller may include a plurality of rollers each roller having an axis of rotation. Alternatively, the transmission bearing may be a spherical or toroidal roller bearing, also having a first and second row of cylinders. Additionally, the transmission bearing 174 may include a bearing housing 177 coupled to a transmission bearing support plate 178. Furthermore, the transmission bearing support plate may be coupled (e.g. rigidly attached) to the housing of the transmission. In this way, the bearing may be structurally supported by the transmission housing 117.

As will be described further herein, bearing 174 supports not only the axial gear load generated by the helical gears of the transmission, but also radial loads of the gears, as well as axial and/or radial loads generated by the electromagnetic apparatus 114. Specifically, the common bearing 174 enables and supports rotation of the gearbox gears, as well as the input shaft of the electromagnetic apparatus 114, thereby enabling a compact power generation assembly construction. Also, while in this example, the transmission output may be a gear other than the sun gear of a planetary gearbox. For example, various other gears may align to rotate on the same axis as the input of the electromagnetic apparatus 114, such as a planet gear and/or ring gear, or others.

The power generation assembly 111 may further include a drive coupling 142, shown also in FIG. 10, coupled to the output shaft and therefore the sun gear. In this embodiment, shoulder bolts 144 may be used to couple the output shaft to the drive coupling. However, alternate suitable couplings, such as bolts with bushings, may be utilized in other embodiments. Further in some examples, the drive coupling may have the shape of a plate or flange.

Returning to FIG. 3, a braking mechanism 146 may be rotatably coupled to the drive coupling 142. The braking mechanism may be a suitable braking mechanism configured to decrease the speed of the output shaft, such as a disk type braking mechanism, utilizing hydraulically actuated pads. Under some conditions, such as during servicing or repair, motion of the output shaft may be decreased and under some conditions substantially inhibited by the braking mechanism. Further, actuation of the braking mechanism may be responsive to a number of operating conditions including lubrication system degradation. Reducing the speed of the output shaft may include substantially inhibiting motion of the output shaft, and therefore the gear-train. In this way emergency braking of the rotating equipment (e.g. the planetary gear-train) may be provided, if needed.

The electromagnetic apparatus 114, which may be a generator or an alternator, is rotatably coupled to the transmission 112. The electromagnetic apparatus is configured to transfer rotational energy, received from the transmission, to electrical energy. The electromagnetic apparatus may be coupled to an electrical transmission system (not shown) which may be routed through the tower to the base. In this example, a synchronous type generator is utilized. Alternatively, an asynchronous generator, such as a double fed induction generator, may be utilized. Further, it can be appreciated that other types of suitable hydraulic or hydrostatic couplings, generators or alternators may be used.

As shown in FIG. 3, the electromagnetic apparatus 114 may include a rotor 148 electromagnetically interacting with a stator 150. In some examples, at least a portion of the rotor may be an electromagnetic apparatus input. The synchronous generator may include a stator frame 152 at least partially enclosing and structurally supporting the stator. The stator frame may be included in an electromagnetic apparatus housing 153, partially surrounding the electromagnetic apparatus. As noted, the transmission housing 117 is separate from, and may be coupled to and decoupled from, the electromagnetic apparatus housing 153. Additionally, the rotor may include a central rotating output shaft 154. When the power generation assembly is assembled (as shown in FIG. 4), the central rotating output shaft is axially aligned with the output shaft of the transmission. Returning to FIG. 3, electrical couplings 156 may be attached to the stator allowing electrical power to be extracted from the electromagnetic apparatus.

The rotor 148 is supported at exterior ends by bearings, including the transmission bearing 174 at the front, input, end, and an electromagnetic apparatus bearing 186 at the rear end. Specifically, electromagnetic apparatus bearing 186 may be located near an output section 188 of the electromagnetic apparatus, at an opposite end (e.g. downwind section) of the electromagnetic apparatus as compared to the rotor coupling.

In some examples, the electromagnetic apparatus bearing is a non-locating single row cylindrical roller bearing. In other examples, alternate types of suitable types of non-locating bearings may be utilized. The electromagnetic apparatus bearing may receive radial loading from the weight of the rotor and associated components. It can be appreciated that the majority of the loading may be in the radial direction, facilitating the use of the non-tapered cylindrical roller bearing. Note that FIG. 3 shows the rotor supported by one locating (transmission bearing 174) and one non-locating bearing (bearing 186), where in some examples no additional bearings may be used to support the rotor.

As noted above, because the rotor shares a bearing support with the gearbox, when the electromagnetic apparatus 114 is decoupled from the transmission 114, the rotor is not fully supported in electromagnetic apparatus 114. Thus, to avoid damage to the rotor, as well as to aid assembly/disassembly, an electromagnetic apparatus input support member, such as a rotor support 157, may be used. The rotor support 157 may be included in and integrally formed in the electromagnetic apparatus housing, and may be configured to receive loads (e.g. radial loads) from the rotor during or after disassembly, or before assembly; yet, allow the rotor to rotate with some resistance during assembly/disassembly and allow free rotation during normal operation of the power generation system. During assembly, the rotor support supports the rotor while the electromagnetic apparatus 114 is manually moved into position prior, for example by a suitable mechanism such as a jack or crane. In this way, an input support member is configured to support the electromagnetic apparatus input when disassembled from the transmission and allow for rotation of the rotor during assembly to and disassembly from the gearbox in an operational turbine.

Thus, it should be appreciated that the rotor support allows the generator to be assembled separately from the gearbox, thereby enabling the generator/alternator to be produced in a different location from the gearbox. Further, the rotor support, it is possible to assemble and test the generator at its place of manufacture. Additionally, the rotor support also allows for field removal of the generator from the gearbox. As the generator is removed from the gearbox, the rotor drops onto the rotor support. This allows the gearbox or the generator to be removed as a component, thus allowing a smaller crane to be used for servicing up-tower, if desired. In this way, the complexity and time in the process of removing the generator is reduced, for example allowing removal/service in a few hours.

In one embodiment, the clearance between the rotor and the rotor support in the assembled position can range from +0.0005 inches to the maximum angular misalignment range of the electromagnetic apparatus bearing 186, discussed in greater detail herein with regard to FIG. 5.

Additionally a rotor stop 159 may be included in the rotor. The rotor stop may be coupled to the rotor by a suitable coupling or may be integrally formed as part of the rotor. The rotor stop may be configured to reduce the likelihood of the rotor sliding out of the stator when the electromagnetic apparatus is disassembled. This feature allows the generator to be more easily removed from the turbine head.

In some examples, the electromagnetic apparatus 114 may generate a substantially steady (e.g. fixed) frequency alternating current (A/C), such as 50 or 60 Hz, for power transmission and functional power usage in a power grid. Various generator configurations may be used to achieve a fixed frequency A/C output.

In a first example, a synchronous generator may be used in conjunction with a power control system. The power control system is configured to convert a variable frequency A/C input to a fixed frequency A/C output. The power control system may be integrated into the synchronous generator or may be coupled exterior to the synchronous generator. Additionally, the power control system may include a frequency generator, having a slip ring, coupled between the generator and the electrical system.

In a second example, a synchronous generator may be used in conjunction with a hydraulic or electric torque control system, such as a hydraulic torque converter. The torque control system may be configured to convert the variable speed rotational input into a single speed output rotational speed, allowing for fixed frequency power generation in the synchronous generator. The torque control system may be rotationally coupled between the transmission and the generator. In some examples, the torque control system may be at least partially integrated into the transmission.

In a third example, an asynchronous generator, such as a double fed induction type generator, may be utilized, where the asynchronous generator is configured to produce a fixed frequency A/C output.

Continuing with FIG. 3, a rotor coupling 160 may be positioned at an exterior portion of the rotor, as further shown in FIG. 11. The rotor coupling may be configured to attach to the drive coupling. Bolts 161 may be used to attach the drive coupling to the rotor coupling. A coupling frame 162, configured to attach the transmission housing and the stator frame, may also be included in the power generation assembly.

In this example, a flexible rotor coupling is utilized, reducing misalignment and loading from the generator from negatively influencing the transmission or visa versa. However, it can be appreciated that a rigid rotor coupling may be utilized. Further in this example, a plurality of bolts may be used to couple the rotor coupling to the drive coupling. Still further, the rotor coupling may have the shape of a plate or flange. In one example, the rotor coupling may be in axial alignment with a radial line or plane of symmetry 180 of the transmission bearing. In this way, the amount of radial load from the rotor may be more evenly distributed on the transmission bearing, decreasing the influence of the rotor weight on unintended movement of the transmission output shaft.

In one example, the rotating coupling of couplings 160 and 142 fixes the generator rotor shaft to the rotating output shaft of the gearbox centers the gravitational forces of the generator above the center of the transmission bearing in a way as reduce any bending moment on the output sun gear of the gearbox. This rotating coupling may contain electrical insulation to reduce stray currents from entering the gearbox system.

Referring now to FIG. 4, the transmission and electromagnetic apparatus are shown assembled, illustrating the integrated and compact structure obtained. As noted above, the transmission input and outputs are co-axially aligned, which in this example enables a pitch control tube 158. The pitch control tube 158 is shown directed through the center of the generator and the transmission (e.g. through the rotor, transmission output shaft, and transmission input), along the central rotating axis 119. In this way, the pitch control tube traverses from the transmission input through the generator and is inside the center of the planetary transmission and electromagnetic apparatus. The pitch control tube may include various conduits (not shown), such as electric wires and/or hydraulic lines, configured to adjust the orientation (e.g. pitch) of the rotor blades. The conduits may be coupled to a suitable controller located in the rotor hub, nacelle or at a down-tower location. Referring now to FIG. 5, it shows selected components of the transmission and electromagnetic apparatus, along with a number of forces, which may be generated, acting upon the components of transmission and electromagnetic apparatus.

The forces include an axial load 164 from the gears in the transmission, such as the exterior portion of the planet gears and the sun gear, due to their helical engagement. Additionally, the forces include static radial loading 166 from the weight of the sun gear as well as dynamic loading 168 with radial components, due to the meshing tolerances in the gear-train, as well as various coupling and housing tolerances. Further, radial loads 170 from the rotor weight and imbalanced loads, including radial and axial components, in the rotor may be included in the forces.

As noted above, the various bearings in the power generation system may perform a number of functions, serving in multiple capacities. First, the bearings allow various components to rotate. Secondly, the bearings may effectively react at least some of the aforementioned forces (e.g. loads) in the power generation system, decreasing the stresses on various components of the power generation system, increasing the components lifespan.

In one particular example, the transmission bearing 174 may react the axial loads from the gear-train 130, any axial loads from the rotor, and the radial loads from the transmission and the electromagnetic apparatus 114. However, the positioning of the transmission bearing, including the axial and radial location, may affect stresses on various components of the transmission. Due to various tolerances in the transmission, as previously mentioned, the sun gear may move in a number of radial directions during operation of the power generation system. This movement is desirable to maintain proper gear contact. If the electromagnetic apparatus loads on the transmission bearing exceed the transmission loads on the transmission bearing, the electromagnetic apparatus can influence the meshing between the sun gear and the exterior portion of the planet gears and cause increased noise, premature wear, and additional vibrations. In one example, imbalanced loads in a gear-train may be determined based on a combination of gear manufacturing tolerances, housing manufacturing errors, and the additional kinematic forces due to gear meshing and the associated errors under speed, such as using factors referred to as $K_{gamma}$ and $K_v$ as referenced in ISO standards, such as ISO 6336.

As shown in table one below, the static radial loading from the gear-train on the transmission bearing may be represented as variable $F_{radial}$. The axial loads from the gear-train on the transmission bearing may be represented as variable $F_{axial}$. The percentage of dynamic loading from the gear-train misalignments and manufacturing tolerances on the transmission bearing may be represented as variables $K_{gamma}$ and $K_v$. The static and dynamic loading from the rotor on the transmission bearing may be represented as variables $F_{r\text{-}static}$ and $F_{r\text{-}dynamic}$, respectively.

TABLE 1

| | |
|---|---|
| $F_{radial}$ | Radial Loading From Gear-train |
| $F_{axial}$ | Axial Loading From Gear-train |
| $K_{gamma}, K_v$ | Dynamic Loading From Gear-train |
| $F_{bearing\angle}$ | Taper or Spherical Bearing Cone Angle (Sin or Cos depending on axial or radial loading) |
| $F_{r\text{-}static}$ | Static Loading From Rotor |
| $F_{r\text{-}dynamic}$ | Dynamic Loading From Rotor |

In some examples, the electromagnetic apparatus loads, such as rotor loads, on the transmission bearing may not exceed the transmission loads on the transmission bearing, expressed by equation 1 shown below, $$F_{r\text{-}static}+F_{r\text{-}dynamic} < (K_{gamma}+K_v) \times F_{radial}+(F_{axial} \times F_{bearing\angle}) \quad (1)$$

It can be appreciated that the aforementioned equation is exemplary in nature and alternate approaches may be used to calculate the location of the coupling and various other components to properly distribute loads in the wind turbine.

Therefore, the longitudinal position along the axis of rotation of the transmission output, the diameter of the bearing, and/or a tapered angle 190 of the rollers within the bearing, may all be selected and sized/positioned to decrease the influence of the electromagnetic apparatus on the transmission, and allow play in the sun gear motion. The tapered angle may include an angle between the axis of rotation of a roller included in a row of the tapered roller bearing and a longitudinally positioned line such as the axis of rotation of the transmission output.

Additionally, at least one of the rollers included in the first row and one of the rollers included in the second row are positioned such that the lines 182 and 184, drawn perpendicular to their respective axes of rotation, form an intersection at a desired point 185. In one example, the intersection of the line from a cylinder in the first row and the line from a cylinder in a second row intersect at a point 185 on the central axis of rotation 119.

In this way, it is possible to integrate the bearing support of the rotor and the transmission output, while still providing sufficient play at the front end of the sun gear so that motion of the planets can allow the planet-gear-interface-area of the sun gear to have an active location during operation.

Note that the above example embodiments are to illustrate various concepts which can include various modifications. For example, the generator may include a rail system that has wheels on the generator and rails on the wind turbine bed plate to allow easy removal of the generator without use of a crane. This would allow disassembly of the generator and then removal of the gearbox or generator as a separate component, thus allowing a smaller crane truck and lowering repair costs significantly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power generation system for a wind turbine included in a nacelle, comprising:
a transmission having an input axially aligned with an output, the input configured to receive rotary motion generated by a wind driven rotor head, the output located downwind of the input;
an electromagnetic apparatus having an input configured to be coupled to the transmission output, wherein the electromagnetic apparatus is a generator and the input of the generator is a rotor, and wherein the output of the transmission is a sun gear in a planetary gear-train included in the transmission; and a bearing configured to radially support both the transmission output and the electromagnetic apparatus input.

2. The system of claim 1 wherein the bearing is included in the transmission and coupled to an exterior portion of the transmission.

3. The system of claim 1 wherein the bearing is a locating-type bearing configured to axially support the transmission output.

4. The system of claim 1 wherein the output is located on a centerline of the turbine.

5. The system of claim 1 wherein the bearing is a double row tapered roller bearing having a first and a second row of rollers, each roller in each of the first and second rows having an axis of rotation and each cylinder having a line perpendicular to the axis of rotation, wherein at least one line from a cylinder included in the first row of rollers and at least one line from a cylinder included in the second row of rollers intersect at a point on a central axis of rotation of the sun gear.

6. The system of claim 1 wherein the bearing is a spherical roller bearing having a first and a second row of rollers, each roller in each of the first and second rows having an axis of rotation and each cylinder having a line perpendicular to the axis of rotation, wherein at least one line from a cylinder included in the first row of rollers and at least one line from a cylinder included in the second row of rollers intersect at a point on a central axis of rotation of the sun gear.

7. The system of claim 1 further comprising a transformer, at least partially enclosed by a housing of the nacelle and electronically coupled to the generator, the transformer configured to increase a voltage of an electrical power output from the generator.

8. The system of claim 1 wherein the electromagnetic apparatus further includes an input support member configured to support the electromagnetic apparatus input when disassembled from the transmission and allow for free rotation of the rotor during operation of the power generation system.

9. The system of claim 8 wherein the support member is integrally formed with a housing of the electromagnetic apparatus, the housing enclosing at least a portion of the input of the electromagnetic apparatus.

10. The system of claim 1 wherein the electromagnetic apparatus further includes an input support member configured to support the electromagnetic apparatus input when disassembled from the transmission and allow for rotation of the rotor during assembly to and disassembly from a gearbox in an operational turbine.

11. The system of claim 1 wherein the output of the transmission and the input of the electromagnetic apparatus are connected by a coupling positioned in radial alignment with a radial line of symmetry of the bearing.

12. The system of claim 11 wherein the coupling is flexible.

13. The system of claim 1 wherein the bearing is positioned such that a moment generated by a sum of loads from the rotor on the bearing, during operation of the wind turbine, is less than a moment generated by a sum of static loads and dynamic loading of the gear-train on the bearing.

14. An integrated power generation assembly in a wind turbine, the wind turbine including a nacelle and a rotor head, the power generation assembly comprising:
a transmission having a co-axial input and output, the transmission further having a planetary gear-train coupling the input and output;
a generator having an input coupled to the transmission output, the generator input co-axial with the transmission input and output;
a bearing axially and radially supporting the transmission output, and further radially supporting the generator input;
a support coupled to a housing of the transmission and fixed to a base-plate of the nacelle to generate a reaction torque; and
a pitch control tube along an axis of the transmission input/output and generator input, the pitch control tube traversing from the transmission input through the generator, the pitch control tube configured to house wires or hydraulic lines from the nacelle to the rotor head.

15. The assembly of claim 14 wherein the bearing is a locating-type bearing, the assembly further comprising a non-locating bearing radially supporting the generator input, the non-locating bearing positioned at an opposite end of the electric generator from the locating bearing.

16. The assembly of claim 15 wherein the bearing support for the generator includes only the locating bearing and the non-locating bearing.

17. The assembly of claim 15 wherein the locating bearing and/or a rotor coupling are positioned so that static and dynamic radial loads from transmission on the bearing is greater than static load and dynamic radial loads from the generator.

18. The assembly of claim 14 wherein the transmission output is a sun gear included in the planetary gear-train and bearing support for the sun gear includes only the bearing.

19. The assembly of claim 14 further including a rotor support configured to receive an axial load from the generator when disassembled from the transmission.

20. The assembly of claim 14 further comprising a braking system coupled to an exterior portion of the transmission.

21. A power generation system for a wind turbine included in a nacelle, comprising:
a transmission having an input axially aligned with an output, the input configured to receive rotary motion generated by a wind driven rotor head, the output located downwind of the input;
an electromagnetic apparatus having an input configured to be coupled to the transmission output; and
a bearing configured to radially support both the transmission output and the electromagnetic apparatus input, wherein the output of the transmission and the input of the electromagnetic apparatus are connected by a coupling positioned in radial alignment with a radial line of symmetry of the bearing.

22. The system of claim 21 wherein the bearing is included in the transmission and coupled to an exterior portion of the transmission.

23. The system of claim 21 wherein the bearing is a locating-type bearing configured to axially support the transmission output.

24. The system of claim 21 wherein the output shaft of the transmission is a sun gear in a planetary gear-train included in the transmission.

25. The system of claim 24 wherein the bearing is a double row tapered roller bearing having a first and a second row of rollers, each roller in each of the first and second rows having an axis of rotation and each cylinder having a line perpendicular to the axis of rotation, wherein at least one line from a cylinder included in the first row of rollers and at least one line from a cylinder included in the second row of rollers intersect at a point on a central axis of rotation of the sun gear.

26. The system of claim 24 wherein the bearing is a spherical roller bearing having a first and a second row of rollers, each roller in each of the first and second rows having an axis of rotation and each cylinder having a line perpendicular to the axis of rotation, wherein at least one line from a cylinder included in the first row of rollers and at least one line from a cylinder included in the second row of rollers intersect at a point on a central axis of rotation of the sun gear.

27. The system of claim 21 wherein the output shaft is located on a centerline of the turbine.

28. The system of claim 21 wherein the electromagnetic apparatus is a generator and the input of the generator is a rotor, and wherein the output shaft of the transmission is a sun gear in a planetary gear-train included in the transmission.

29. The system of claim 21 further comprising a transformer, at least partially enclosed by a housing of the nacelle and electronically coupled to the generator, the transformer configured to increase a voltage of an electrical power output from the generator.

30. The system of claim 21 wherein the electromagnetic apparatus further includes an input support member configured to support the electromagnetic apparatus input when disassembled from the transmission and allow for free rotation of the rotor during operation of the power generation system.

31. The system of claim 21 wherein the electromagnetic apparatus further includes an input support member configured to support the electromagnetic apparatus input when disassembled from the transmission and allow for rotation of the rotor during assembly to and disassembly from a gearbox in an operational turbine.

32. The system of claim 31 wherein the support member is integrally formed with a housing of the electromagnetic apparatus, the housing enclosing at least a portion of the input of the electromagnetic apparatus.

\* \* \* \* \*